United States Patent Office 3,289,357
Patented Dec. 6, 1966

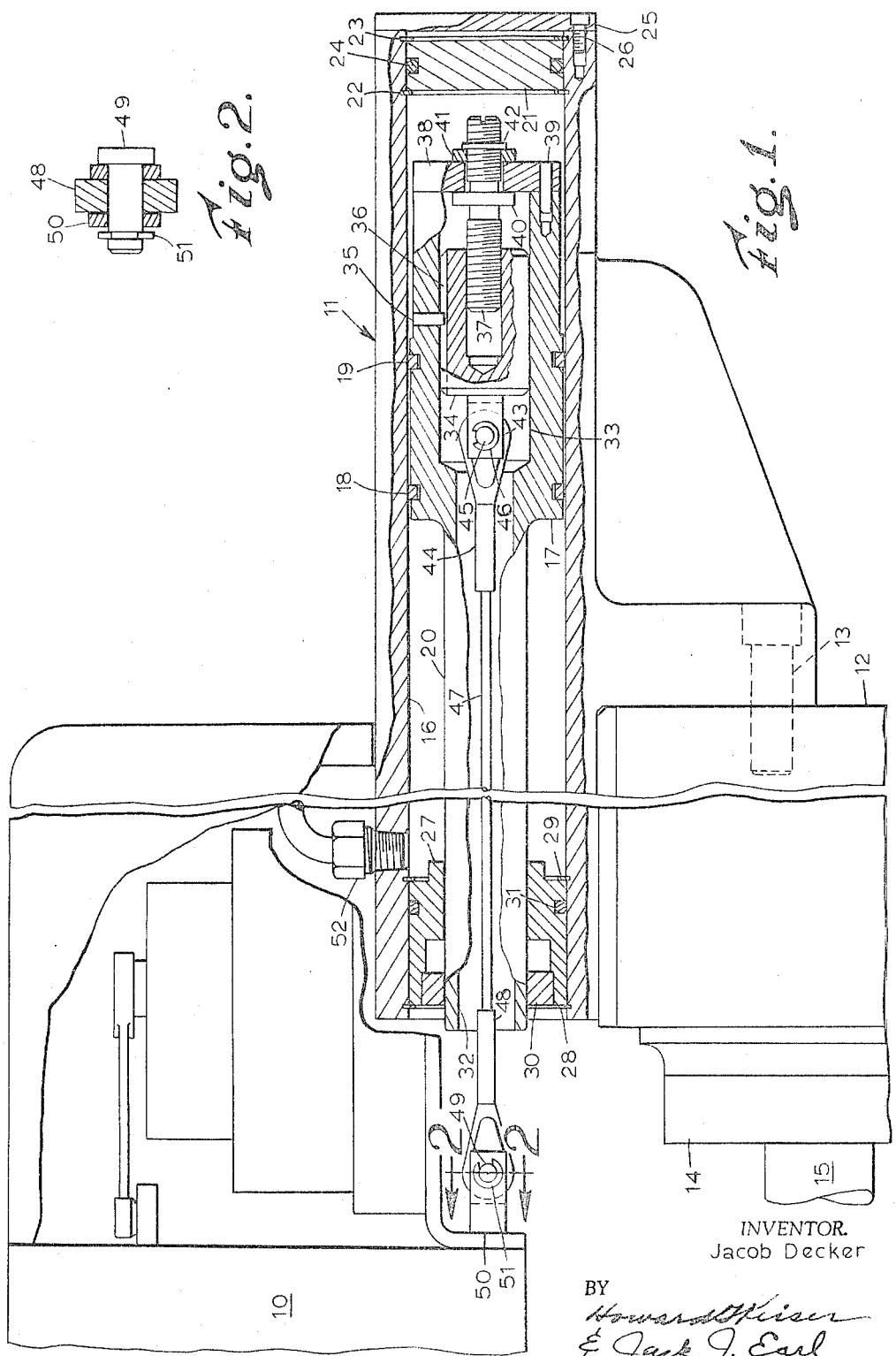

3,289,357
MACHINE TOOL ANTI-BACKLASH MECHANISM
Jacob Decker, Cincinnati, Ohio, assignor to The Cincinnati Milling Machine Co., Cincinnati, Ohio, a corporation of Ohio
Filed Aug. 28, 1964, Ser. No. 392,691
3 Claims. (Cl. 51—165)

This invention relates to machine tools and more particularly to an improved anti-backlash bias motor for use in machines where extreme accuracy of movement is required for producing precision work.

In the production of parts in highly precise operations such as the grinding of workpieces to size within an acceptable range of only a few millionths of an inch, any variable factor affecting movement of the machine slides can result in unacceptable performance of the machine and a lack of parts duplication within the allowable variance. It is therefore imperative that all forces acting on the machine slides be controlled with great accuracy and without variable factors to influence the machine performance. In order to reduce the ever present stick-slip phenomenon in machinery, one of the common variable factors, very accurate alignments are required so that drag between relatively movable members is minimized. It is a common practice to provide a mechanism producing a constant bias force on a slide acting in a direction parallel to the direction of slide movement where the slide is reciprocated in one direction and the other. The most common mechanism to produce these anti-backlash forces is a piston and cylinder motor connected to the slide and operated to produce a constant force in one direction. To avoid dragging between members in this motor, it must be accurately aligned with the slide ways and must maintain the alignment through the life of the machine. Even very small misalignments can affect the smoothness of operation since the piston and the connecting rod of the motor must fit closely to provide fluid seals. Any tendency to produce a drag, and especially a variable drag, on these members results in an increase in the tendency for stick-slip motion of the entire machine system and a corresponding adverse effect in operational results. Misalignment of the piston and cylinder results in a drag in the mechanism that varies as the piston is moved from one end to the other in the cylinder, especially at the piston rod due to a variable angle as the rod is moved out and back.

It is therefore an object of this invention to provide an anti-backlash motor which can be installed without the requirement of extreme accuracy in alignment and yet is one which does not produce an increase in stick-slip movement.

It is also an object of this invention to provide an anti-backlash piston and cylinder motor which, although it is progressively misaligned as a result of machine use and slide way wear, continues to function without progressively increasing the stick-slip phenomenon in the machine that would otherwise be attributable to this misalignment.

Another object of this invention is the provision of an anti-backlash piston and cylinder bias motor in which the drag does not vary as the piston is moved from one end to the other.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In a preferred form, this invention includes a cylinder that is spaced from the wheelhead of a grinding machine and that extends generally parallel to the direction of movement of the wheelhead on the base of the machine as it is moved toward and from a workpiece. A piston is slidably received in the cylinder and fluid under pressure is constantly connected to move it away from the wheelhead. A piston rod extends from the piston toward the wheelhead and out from the end of the cylinder nearest to the wheelhead. The piston rod is hollow to provide access from outside of the cylinder into the piston and a flexible tension member in the form of a wire is connected to the piston and extends through the piston rod to the wheelhead to which it is connected at its other end. The constant force tending to move the piston away from the wheelhead then maintains the wire in tension and produces a constant pull on the wheelhead tending to move it always in the same direction so that the backlash in the feed mechanism is always in the same condition to provide the effect of a backlash free system. A clear understanding of the construction and operation of the mechanism of the present invention can be obtained from the following detailed description in which reference is made to the attached drawings wherein:

FIG. 1 is a longitudinal section view of the mechanism of this invention.

FIG. 2 is a section of the mechanism as viewed on line 2—2 of FIG. 1.

The mechanism shown in FIG. 1 includes a wheelhead 10 which is slidably movable away from and back toward a backlash motor indicated generally by reference 11 which is fixed to the rear of the machine base 12 by screws 13. The wheelhead 10 is that of a conventional center-type grinder and is moved on the machine base 12 by a feed mechanism 14 housed in the base 12 and which includes a feed screw 15 that is engaged through a nut (not shown) fixed to and depending below the wheelhead 10. Feed mechanisms of this type are well known and further description is not included herein. Feed mechanisms of this type using feed screws 15 have an inherent looseness to allow for relative movement of the parts and as a result there is a small amount of lost motion or backlash in the system. Therefore small uncontrolled movements of the wheelhead can occur during stick-slip type of movement. Since the wheelhead 10 is sliding on the base 12 and since the feed mechanisms for machine tools usually contain many relatively sliding members, there is a tendency toward stick-slip movement and the presence of backlash in the feed system combined with this tendency for stick-slip motions will result in frequent small jerks or uncontrolled movements in the feed motion. The normal practice is to provide an anti-backlash motor which tends always to move the wheelhead 10 in one direction to eliminate the backlash in the system. However, these anti-backlash motors also can operate in a stick-slip manner so that the force which they provide fluctuates and allows for periodic operation without the proper anti-backlash force. Therefore the specific anti-backlash motor 11 is provided to produce a more constant force than has been possible heretofore except in machines where extremely accurate alignment of the motor was achieved and constant realignment was performed as the slide ways on which the wheelhead moved were worn away.

The motor 11 of this invention is comprised of a cylinder 16 that is aligned generally in the direction of movement of the wheelhead 10. This alignment need not be exact but best results dictate that it be reasonably close to the same direction. A piston 17 is received in the cylinder 16 for movement toward and away from the wheelhead 10 and a pair of piston rings 18, 19 are received around the piston 17 to provide a fluid-tight seal between the ends of the piston 17. These rings 18, 19 are in actual contact inside the cylinder 16 and support the piston 17 so that only a small surface area is in sliding contact. The piston 17 includes a piston rod 20 that is integral therewith and extends from one end of the piston 17 toward the wheelhead 10. The end of the cylinder 16 away from the wheelhead 10 is closed and sealed by a bulkhead member 21 held in place by snap rings 22, 23 and including an O-ring seal 24. A cover 25 is secured to the end of the motor 11 by screws 26. The other end of the cylinder 16 is closed by a bulkhead member 27 that is held in the end of the cylinder nearest to the wheelhead 10 by snap rings 28, 29. The member 27 is open-centered and fits closely around the rod 20. A fluid-tight sliding seal is provided at the member 27 by the close fit of that member around the rod 20 and by the packing member 30 that is included in the member 27 for sliding contact around the rod 20. An O-ring seal 31 is provided around the member 27 to prevent fluid leakage at this end of the cylinder 16.

The rod 20 is not connected to the wheelhead 10 and is not operative to transmit any forces from the motor 11 to the wheelhead 10. The rod 20 is hollow, however, having a bore 32 extending axially therethrough and into the piston 17. The piston 17 has an internal bore 33 into which the rod bore 32 opens and a member 34 is received in the piston bore 33 for axial positioning therein. The member 34 is prevented from rotating in the piston 17 by a pin 35 that is fixed in the piston 17 and extends into a slot 36 along one side of the member 34. The member 34 is maintained in a selected axial position in the piston 17 by a screw 37 that is in threaded engagement with one end of the member 34 and which is held in a fixed axial position through a cap 38. The cap 38 is secured on the end of the piston 17 by pins 39 and the screw 37 has a flange 40 that is held in place against the cap 38 by a nut 41 engaged over the outer end of the screw and locked in place by a snap ring 42.

A yoke 43 is formed on the end of the member 34 at the end opposite to the screw 37 and the looped end of a wire terminal 44 is embraced between the tines of the yoke 43. A pin 45 is received through the yoke 43 and wire terminal 44 and is held in place by a snap ring 46. The wire terminal 44 is fixed onto the end of a wire 47 which extends outward from the yoke 43 through the bore 32 in the piston rod 20. The member 34 is positioned in the piston 17 so that the pin 45 is midway between the piston rings 18 and 19. The wire 47 as shown is a single strand flexible wire but a multi-strand cable is equally well suited for this purpose, it being required that the wire be capable of a rather large tensile stress and yet be flexible so as not to transmit any appreciable lateral loading from end to end. The other end of the wire 47 also has a looped terminal 48 fixed thereon and thus is secured by a pin 49 to a yoke 50 that extends out from the wheelhead 10 toward the motor 11. The pin 49 is held in place in the yoke 50 by a snap ring 51. The section of FIG. 2 shows the construction at the headstock yoke 50 which is the same as that at the other yoke 43. The terminals 44 and 48 are each pivotal over the pins 45 and 49.

The wire 47 is maintained in tension to provide the bias force that tends to urge the wheelhead 10 toward the right as viewed in FIG. 1. To do this, a fluid line connection 52 is provided in the cylinder 16 whereby fluid under pressure is connected constantly to the space between the piston 17 and the bulkhead member 27 to urge the piston 17 toward the right in the cylinder 16 as viewed in FIG. 1. The right side of the cylinder 16 is vented to drain to prevent the formation of back pressure therein and to carry away any leakage around the piston 17. This drain vent is not shown in the drawings. The constant force is overcome by the feed mechanism 14 during advancing feed movement of the wheelhead 10 toward the left and when the wheelhead 10 is subsequently retracted it provides the force to move the wheelhead back toward the right at a rate determined by the reverse operation of the feed mechanism 14. Thus, the feed mechanism appears to be free of lost motion. It can also be seen that the cylinder 16 need not be maintained in exact alignment with the direction of wheelhead travel to provide a constant pull on the wheelhead. There is no drag on the piston rod 20 resulting from misalignment of the cylinder 16 since there is no load on the rod 20. If the cylinder 16 is not exactly aligned, the wire 47 will be at some slight angle to the axis of the cylinder 16 but a variable drag force will not be produced. Consequently the described motor 11 will produce results superior to previously known anti-backlash systems and it is especially useful in the extremely precise grinding machines needed to grind to the now relatively common tolerances of a few millionths of an inch. While the invention has been described in connection with one possible form or embodiment thereof, it is to be understood that the present disclosure is illustrative rather than restrictive and that changes and modifications can be made therein without departing from the spirit of the invention or the scope of the claims which follow.

What is claimed is:

1. In a machine tool having a slide received on a base for reciprocal movement by a feed mechanism, an anti-backlash motor adapted to impose a constant bias force in one direction comprising in combination:
 (a) a cylinder fixed to the machine base and spaced from the slide,
 (b) a piston received in said cylinder for movement in the direction of movement of the slide,
 (c) a hollow piston rod connected to one end of the piston and extending outward from said cylinder toward the slide,
 (d) means for sealing one end of said cylinder around said rod to allow axial movement thereof,
 (e) a flexible wire extending loosely through said rod,
 (f) means for securing one end of said wire inside said piston,
 (g) means for securing the other end of said wire to the slide, and
 (h) means for connecting fluid under pressure to the cylinder between said means for sealing and said piston to urge said piston away from the slide and maintain said wire in tension.

2. In a machine tool having a slide received on a base for reciprocal movement by a feed mechanism, an anti-backlash motor adapted to impose a contant bias force in one direction comprising in combination:
 (a) a cylinder fixed to said machine base and spaced from the slide,
 (b) a piston received for movement in the cylinder in the direction of movement of the slide,
 (c) a hollow piston rod extending from one end of said piston and outward from said cylinder toward the slide,
 (d) means for sealing one end of said cylinder around said rod to allow axial movement thereof,
 (e) a flexible wire extending loosely through said rod,
 (f) means for pivotally connecting one end of said wire inside said piston,
 (g) means for pivotally connecting the other end of said wire to the slide, and
 (h) means for connecting fluid under pressure to the cylinder between said means for sealing and said piston to urge said piston away from the slide and maintain said wire in tension.

3. In a machine tool having a slide received on a base for reciprocal movement by a feed mechanism, an anti-backlash motor adapted to impose a constant bias force in one direction comprising in combination:
 (a) a cylinder fixed to said machine base and spaced from the slide, (b) a piston received in the cylinder for movement in the direction of movement of the slide,
(c) a hollow piston rod connected to one end of the piston and extending outward from said cylinder toward the slide,
(d) means for sealing one end of said cylinder around said rod to allow axial movement thereof,
(e) a flexible wire extending loosely through said rod and having a loop formed at each end thereof,
(f) a first pin fixed in said piston and extending through one end loop of said wire to provide a pivotal connection of said wire inside said piston,
(g) a second pin fixed to the slide and extending through the other end loop of said wire to provide a pivotal connection of said wire to the slide, and
(h) means for connecting fluid under pressure to the cylinder between said means for sealing and said piston to urge said piston away from the slide and maintain said wire in tension.

References Cited by the Examiner
UNITED STATES PATENTS

| | | | |
|---|---|---|---|
| 1,683,859 | 9/1928 | Brown | 51—165 |
| 2,368,992 | 2/1945 | Ljunggren | 51—50 |

LESTER M. SWINGLE, *Primary Examiner.*